US007493566B2

(12) United States Patent
Nakajima et al.

(10) Patent No.: US 7,493,566 B2
(45) Date of Patent: Feb. 17, 2009

(54) DISPLAY OF INFORMATION FOR TWO OPPOSITELY SITUATED USERS

(75) Inventors: Amane Nakajima, Tokyo (JP); Yoshihiko Ohta, Kanagawa-ken (JP); Kiyoshi Tsubata, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 11/313,499

(22) Filed: Dec. 19, 2005

(65) Prior Publication Data

US 2007/0143690 A1 Jun. 21, 2007

(51) Int. Cl.
*G06F 3/00* (2006.01)

(52) U.S. Cl. ........................ 715/750; 715/751; 715/790

(58) Field of Classification Search ................ 715/750, 715/751, 754, 790

See application file for complete search history.

(56) References Cited

U.S. PATENT DOCUMENTS 5,613,017 A * 3/1997 Rao et al. ................... 382/174
6,151,552 A * 11/2000 Koizumi et al. ............. 701/211
2004/0201544 A1* 10/2004 Love et al. ................... 345/1.1

FOREIGN PATENT DOCUMENTS

JP 05197507 A 8/1993
JP 05197507 A * 8/1993

* cited by examiner

*Primary Examiner*—Ba Huynh
*Assistant Examiner*—Enrique W Iturralde

(57) ABSTRACT

Display of information for two oppositely situated users is improved. A computing device includes a display and a mechanism. A first user views the display at a first end thereof, and a second user views the display at a second end thereof opposite the first end. The mechanism orients information displayed on the display so that the information is right-side-up for the second user. The mechanism displays a first window that is right-side-up for the second user, in which the information is displayed in a scaled manner. The first window overlaps the information displayed on the display. The mechanism may display a second window on the display that is right-side-up for the user, and that displays a portion of the information in a full-size, non-scaled manner. Alternatively or additionally, the mechanism may display a blacked-out portion within the first window corresponding to where the first window overlaps the information displayed.

19 Claims, 9 Drawing Sheets

DISPLAY OF INFORMATION FOR TWO OPPOSITELY SITUATED USERS

FIELD OF THE INVENTION

The present invention relates to displaying information on a display, such as a display of a computing device, such that two oppositely situated users are able to view the information, in an improved manner.

BACKGROUND OF THE INVENTION

Portable computers, like notebook and laptop computers, have become increasingly popular. Users of such computers have the ability to perform computing tasks wherever they happen to be located. Furthermore, portable computers have been successfully used for two users to view displayed information at the same time, even where these users sit opposite to one another.

Consider the typical situation 100 depicted in FIG. 1. Two users 102 and 104 are seated and situated opposite to one another. The user 102 is using a portable computer 106. The portable computer 106 has a display 108 that is hinged so that the display 108 can be positioned substantially parallel to the top of the table on which the computer 106 is resting. As a result, both the user 102 and the user 104 are able to view the display 108 of the portable computer 106.

The user 102 is the primary user of the portable computer 106. Therefore, the information displayed on the display 108 is usually displayed right-side-up from the perspective of this user 102. This is disadvantageous, however, in that the user 102 may be trying to show the user 104 something on his or her computer 106, which is why the display 108 has been folded back so that it is parallel to the top of the table. That is, when the user 102 is showing the user 104 the information on the display 108, the information is normally upside-down from the perspective of the user 104, instead of being right-side-up, for instance.

Therefore, a technology has been developed by which at the selection of a menu item, or at a press of one or more buttons, the information displayed on the display 108 of the computer 106 is flipped upside-down. As a result, the information is displayed right-side-up for the user 104 to whom the user 102 is showing the information. This is depicted in the top view of FIG. 1 shown in FIG. 2. The information 202 displayed on the display 108 has been flipped upside-down so that it is displayed right-side-up for the user 104. Therefore, the user 102 is able to show the information 202 to the user 104, without the user 104 having to be on the same side of the display 108 as the user 102 is.

A further disadvantage, however, is that once the information 202 is displayed right-side-up to the user 104, it is difficult for the user 102 to control the computer 106, since the information 202 is displayed upside-down to the user 102. The user 102 is the user controlling the computer 106, since, as depicted in FIG. 1, the part of the computer 106 that typically includes a keyboard and a pointing device like a touch pad is situated nearer the user 102, as can be appreciated by those of ordinary skill within the art. Although the user 102 is able to enter input in relation to the keyboard and the pointing device, because the information 202 is displayed upside-down to the user 102, it is difficult for the user 102 to perform such entry.

Therefore, another technology has been developed by which a small window 204 is displayed in a corner of the display 108, in which at least substantially all of the information 202 is displayed in a scaled manner and right-side-up to the user 102. That is, whereas the information 202 itself is displayed upside-down to the user 102, the scaled version of this information within the window 204 is displayed right-side-up to the user 102. Therefore, when the user 102 controls the pointing device, for instance, to move the pointer 206 in relation to the information 202, a corresponding pointer may be moved within the window 204. As a result, the user 102 can perform input by concentrating on the scaled display of the information 202 within the window 204.

However, the scaled display of at least substantially all the information 202 within the small window 204 is nevertheless disadvantageous. First, because the window 204 is so small, it is difficult for the user 102 to perform accurate input. For instance, precise movement of the pointer 206 can be difficult to accomplish in relation to the scaled version of the information 202 within the window 204. Furthermore, text entry may be difficult to accomplish, because the text may be so small within the window 204 so as to be nearly if not completely indiscernible.

Another disadvantage is that the window 204 covers up a portion of the display 108 that is otherwise used by the information 202. However, this portion is seen within the window 204, such that the user 102 may reference it, even though the user 104 cannot see it, which is disadvantageous. For instance, if the user 102 wants to show the user 104 a portion of the information 202 that is covered by the window 204, he or she may not be able to accomplish this. Furthermore, if text entry or other input, such as pointer movement, is desired in relation to the portion of the information 202 overlapped by the window 204, this can also be difficult to achieve.

For these and other reasons, therefore, there is a need for the present invention.

SUMMARY OF THE INVENTION

The present invention relates to an improved display of information for two oppositely situated users. A computing device, such as a portable computer device like a laptop or notebook computer, of an embodiment of the invention includes a display and a mechanism. A first user views the display at a first end thereof, and a second user views the display at a second end thereof opposite the first end. The mechanism at least substantially orients information displayed on the display so that the information is right-side-up for the second user. The mechanism displays a first window that is right-side-up for the second user, however, in which at least substantially all of the information is displayed in a scaled manner. The first window overlaps the information displayed on the display.

The mechanism may display a second window on the display that is right-side-up for the user, and that displays a portion of the information in a full-size, non-scaled manner. The mechanism may permit the first user to perform input actions in relation to the portion of the information within the second window, where the portion of the information displayed therewithin is that in relation to which the first user is attempting to perform such input actions. Where the user is not attempting to perform such input actions, like keyboard input and/or pointing device input, the portion of the information displayed within the second window may be that which currently has focus.

The mechanism may alternatively or additionally display a blacked-out portion within the first window corresponding to where the first window overlaps the information displayed on the display. The mechanism may further move the first window where input actions are attempted to be performed in relation to the information where the first window is overlapping. As a result, the first window no longer overlaps the information where the input actions are attempted to be performed. The mechanism may further detect that the input actions are being attempted to be performed in relation to the information where the first window is overlapping.

A method of one embodiment of the invention is performed in relation to a display for a computing device at which a first user views the display at a first end thereof and a second user views the display at a second end thereof opposite the first end. Information accounting for a majority of a size of the display is displayed on the display such that the information is at least substantially oriented to be right-side-up for the second user. Where keyboard input is being performed on the computing device, the method determines a portion of the information in relation to which the keyboard input is being performed as an operation area of the information. Otherwise, where pointing device input is being perform on the computing device, the method determines a portion of the information in relation to which the pointing device input is being performed as the operation area of the information. Otherwise still, the portion of the information that currently has focus is determined as the operation area. The method thus displays at least a portion of the operation area of the information within a window on the display that is right-side-up for the first user, such that the portion of the operation area is displayed in a full-size, non-scaled manner.

A method of another embodiment of the invention is also performed in relation to a display for a computing device at which a first user views the display at a first end thereof and a second user views the display at a second end thereof opposite the first end. As before, information accounting for a majority of a size of the display is displayed on the display such that the information is at least substantially oriented to be right-side-up for the second user. A window is displayed on the display that is right-side-up for the first user and in which at least substantially all of the information is displayed in a scaled manner and that overlaps the information. Furthermore, a blacked-out portion within this window is displayed, corresponding to where the window overlaps the information. The window is further moved where input actions are being attempted to be performed in relation to the information where the first window overlaps, so that the window no longer overlaps the information where such input actions are being attempted to be performed.

Embodiments of the invention thus provide for advantages over the prior art. In particular, the disadvantages associated with using a window that shows information right-side-up to a first user in a scaled manner, where the information accounts for the majority of the size of the display is shown right-side-up to an oppositely situated second user. For instance, accurate input by the first user is able to be achieved, because the portion of the information in relation to which keyboard and/or pointing device input is being achieved is displayed in another window in a full-size, non-scaled manner and is right-side-up to the first user. Therefore, such input is more easily and precisely accomplished.

As another example, where the window that shows the information right-side-up to the first user in a scaled manner overlaps the primary display of this information to the second user, a blacked-out portion corresponding to the window is displayed within the window. This blacked-out portion serves to remind the first user that this portion of the information cannot be seen by the second user. As a result, when referring to the information, the first user may omit explanation of the overlapped portion of the information, or otherwise take the fact that it cannot be seen by the second user into account.

Furthermore, as a third example, where keyboard input and/or pointing device input is being achieved in relation to the overlapped portion of the information, or the overlapped portion is otherwise being accessed, the window is automatically moved, so that the portion of the information in question is no longer overlapped by the window. As a result, such input or access is more easily accomplished. Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
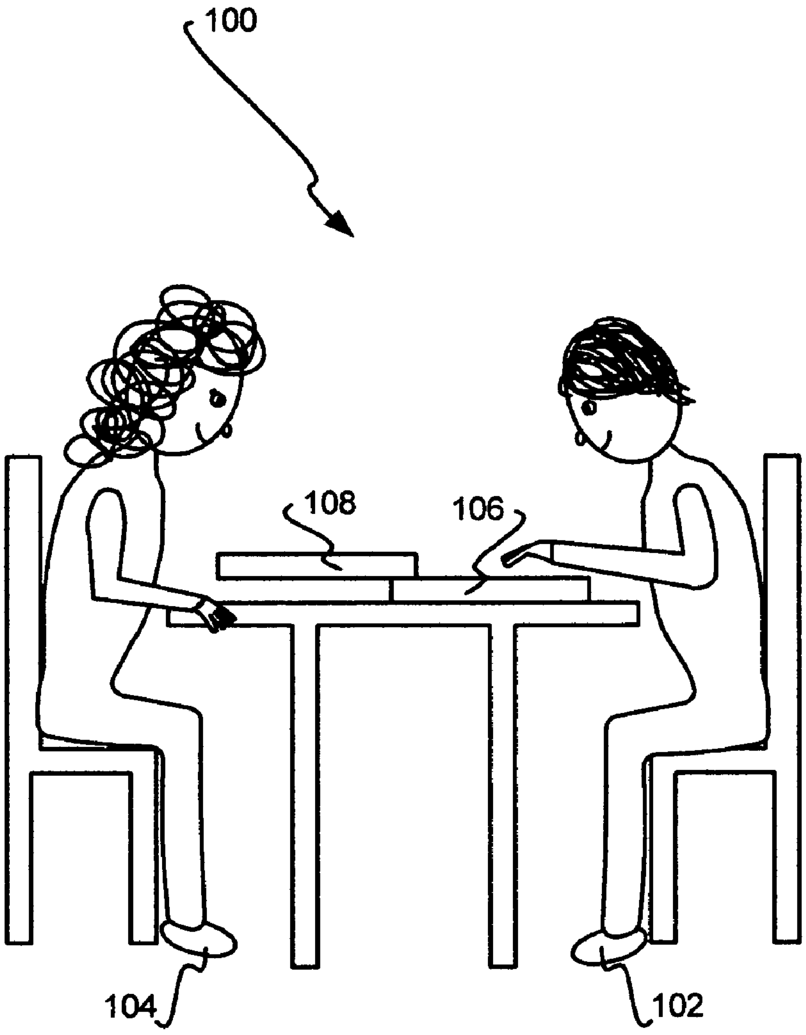
PRIOR ART FIG 1
FIG. 1 is a diagram depicting two oppositely situated users viewing a computing device having a display, according to the prior art, and in accordance with which embodiments of the invention may be implemented.

Embodiments of the invention can be implemented in relation to the prior art scenario described in the background section in relation to FIG. 1. That is, there are two oppositely situated users viewing a display of a computing device. One user is the controlling user of the computer, whereas the other user is just a viewer. The primary information displayed on the display is displayed right-side-up to the viewing-only user, and is displayed upside-down to the controlling user. There is a window that shows this information in a scaled manner right-side-up to the controlling user. Therefore, embodiments of the invention can be implemented in relation to a computing device, like a laptop or notebook computer, that may have a hinged display so that it is adapted to being positioned substantially parallel to the surface on which the computer rests.

Figure 3:
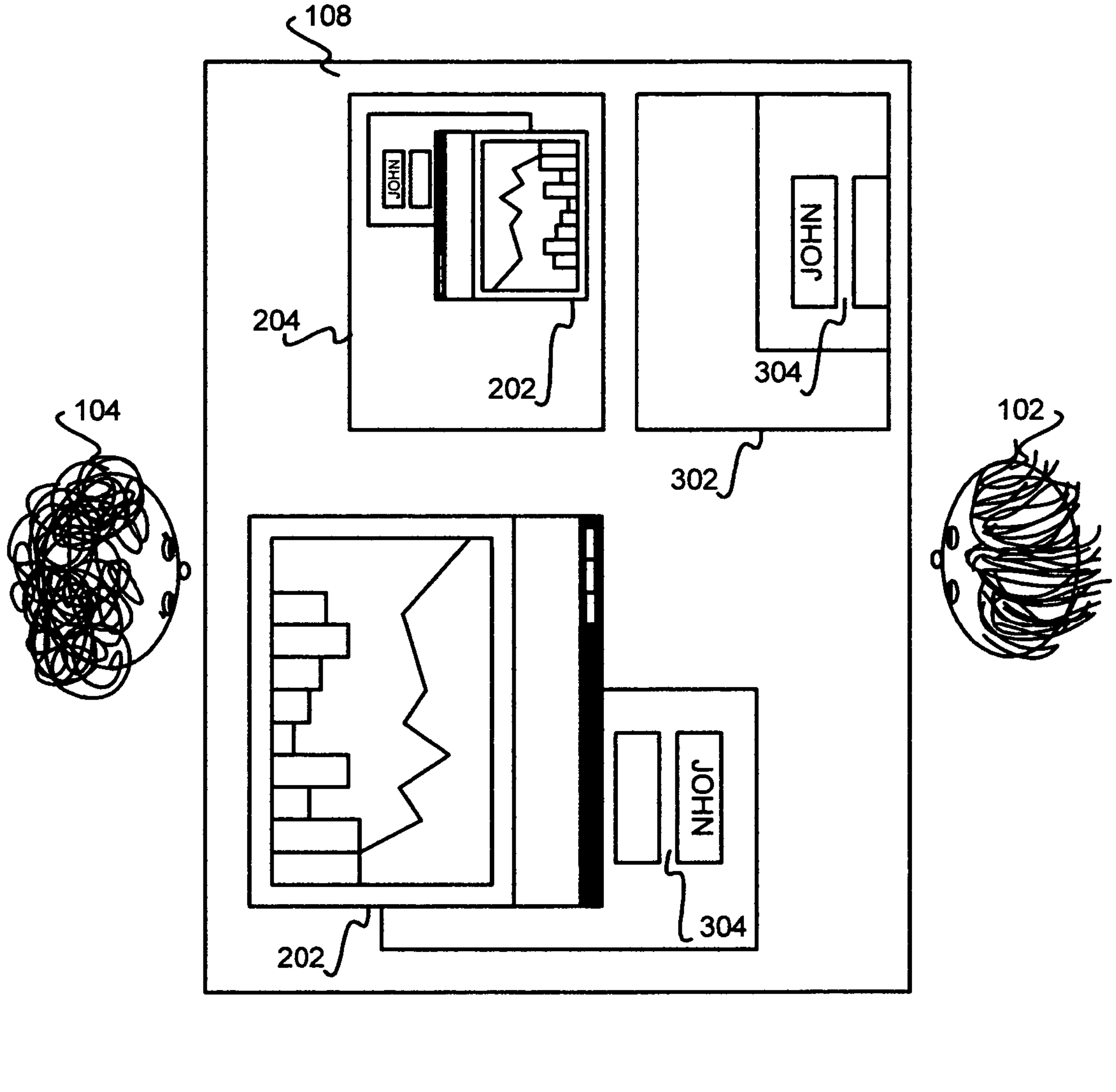
FIG. 3 is a top-view diagram of the display of FIG. 1, in which there is an additional window, according to an embodiment of the invention.

FIG. 3 shows a top view of the display 108 of the computing device 106, according to an embodiment of the invention. As has been described, the user 102 views the information 202 take accounts for the vast majority of the size of the display 108 upside-down, whereas the user 104 views this information 202 right-side-up. However, there is a window 204 in which the information 202 is displayed in a scaled manner, and that is displayed right-side-up to the user 102.

Furthermore, FIG. 3 includes another window 302. In comparison to the window 204, the window 302 displays a portion 304 of the information 202 in a full-size, non-scaled manner. When the user 102 attempts to perform input actions, such as keyboard text entry and/or pointing device actions, the portion 304 of the information 202 in relation to which these actions are performed is displayed in a full-size, non-scaled manner to the user 102 right-side-up. As a result, the user 102 is able to more precisely achieve such input actions, since he or she views the portion 304 of the information 202 to which they relate in a full-size, non-scaled manner, and right-side-up.

When the user 102 is not performing input actions, the portion 304 of the information 202 that is displayed in the window 302 is that which has focus. Focus is generally described as follows. In computer programs, the current window, menu or dialog box that is affected by a key stroke or pointing device movement has focus. For instance, after you click from one window to another, the second window is said to have focus.

Therefore, the embodiment of FIG. 3 operates as follows. When the user 102 is performing keyboard input, the portion of the information 202 that receives or otherwise displays this input is the portion that is displayed in the window 302. If the user is not performing keyboard input, but is moving the pointer via pointing device input, such as, for instance, moving a finger on a touch pad or moving a mouse, then the portion of the information 202 at which the pointer is currently displayed is the portion that is displayed in the window 302. If the user is not performing keyboard input, and is not performing pointing device input, then the portion of the information 202 that has focus is the portion that is displayed in the window 302.

Figure 2:
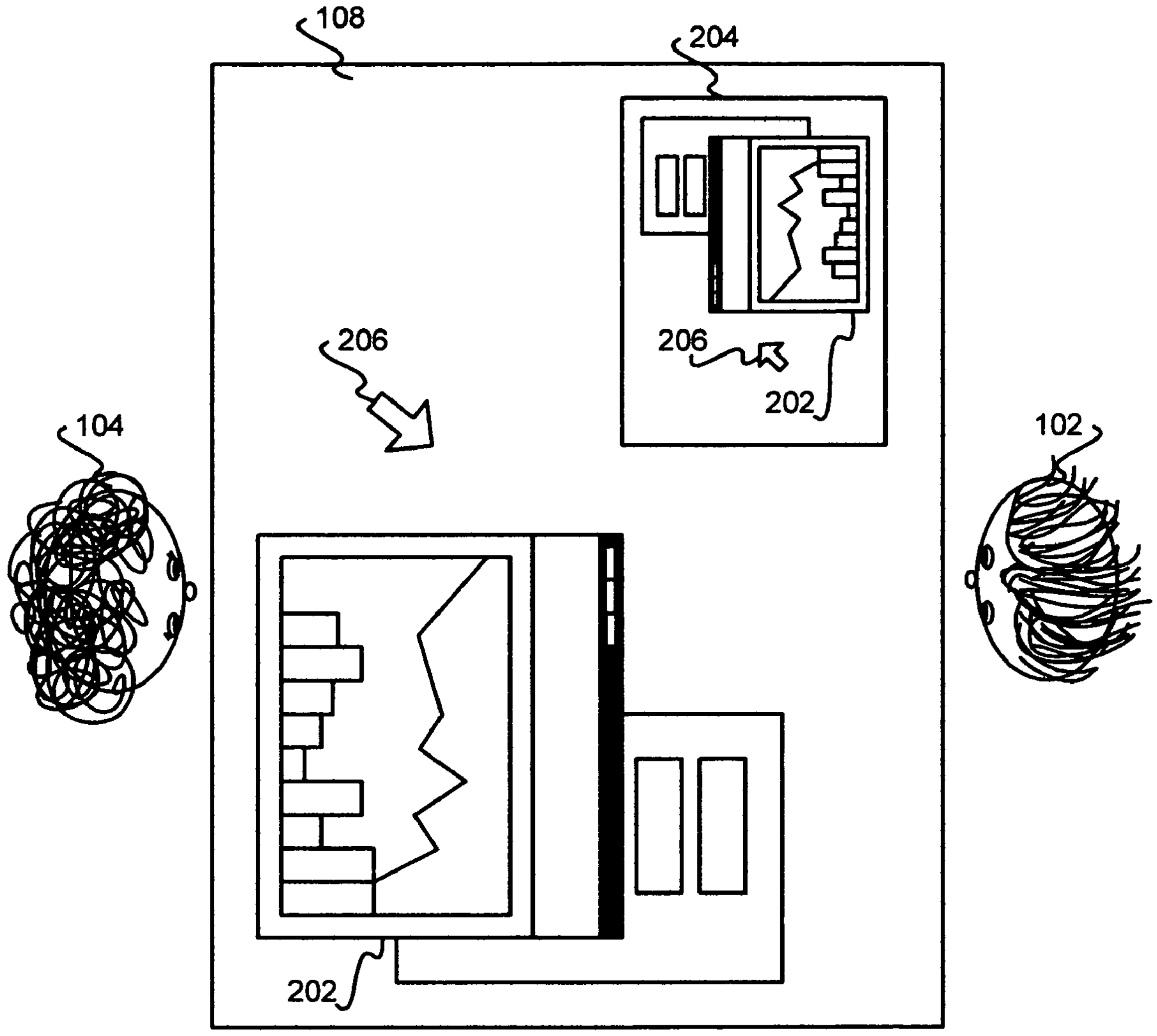
PRIOR ART FIG 2
FIG. 2 is a top-view diagram of the display of FIG. 1, according to the prior art.
Figure 4:
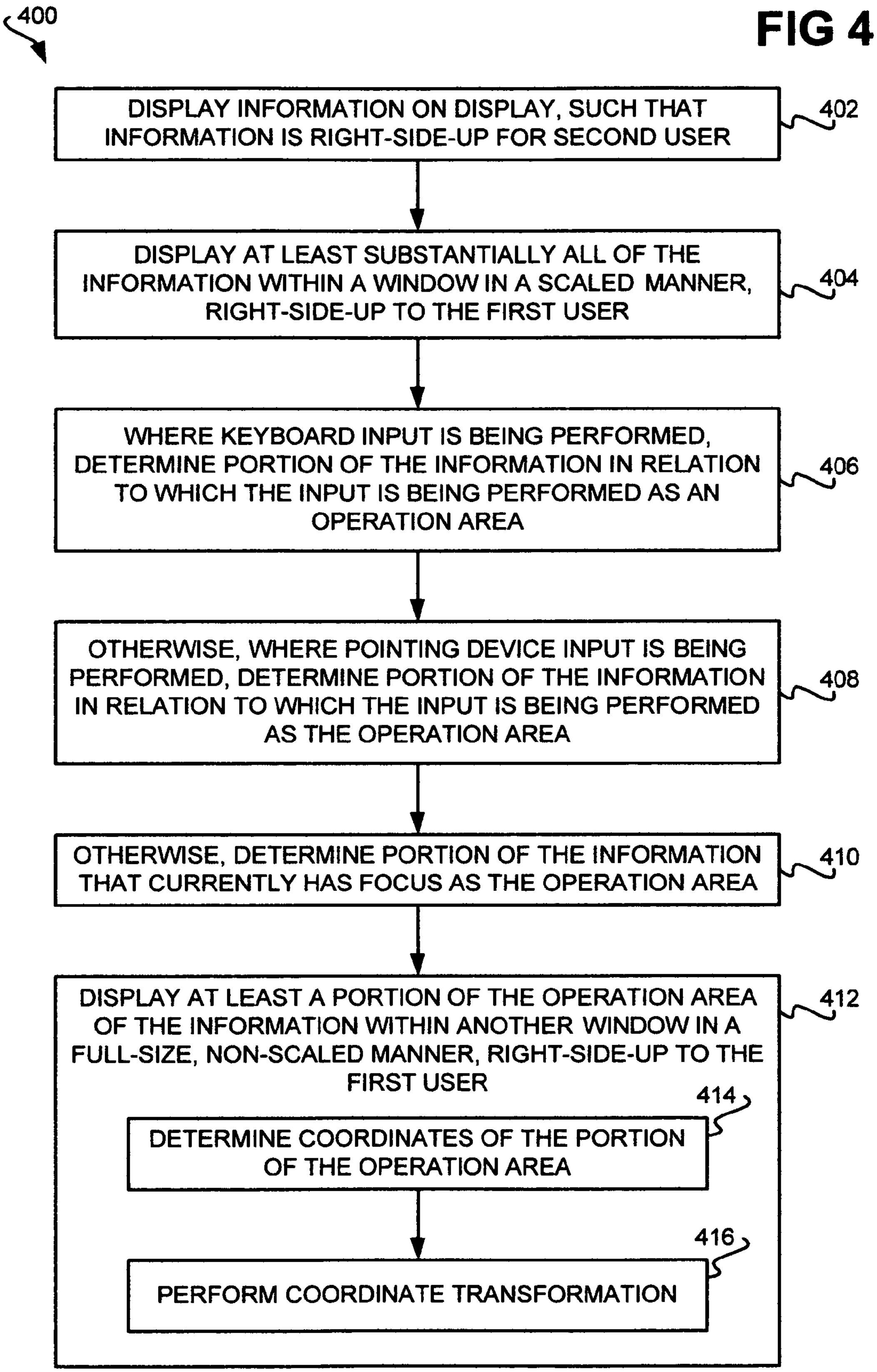
FIG. 4 is a flowchart of a method for achieving the display of information depicted in FIG. 3, according to an embodiment of the invention.

FIG. 4 shows a method 400 that achieves the display of information on the display 108 of FIG. 3, according to an embodiment of the invention. The method 400 is described in relation to FIG. 3 for descriptive clarity. It is noted that the method 400 may be repeated periodically, such as every 100 or 200 milliseconds. First, the information 202 is displayed on the display 108, such that the information 202 is right-side-up to the user 104 (402), and at least substantially all of the information 202 is displayed within the window 204 in a scaled manner, right-side-up to the user 102 (404), as is conventional. It is noted that the information 202 accounts for a majority of the size or space of the viewable area of the display 108. The information 202 itself is inherently considered to be full-sized, and non-scaled.

Where keyboard input is being performed, such as one or more keys being pressed by the user 102 on the keyboard of the computing device 106 of FIG. 1, the portion of the information 202 in relation to which the input is being performed is considered an operation area (406). This portion is the portion of the information 202 that displays the key presses, for instance, or otherwise receives indication of them. By comparison, where keyboard input is not being performed, but where pointing device input is being performed, the portion of the information 202 in relation to which this input is being performed is considered the operation area (408). This portion is the portion of the information 202 that the pointer 206 of FIG. 2, for instance, is currently over. Pointing device input can include moving this pointer, or clicking one or more buttons on the pointing device in question.

Where neither keyboard input nor pointing device input is being performed, the portion of the information 202 that currently has focus is considered the operation area (410). Regardless of how the operation area is determined, however, at least a portion of the operation area of the information 202 is then displayed within the window 302, in a full-size and non-scaled manner, such that it is right-side-up to the user 102 (412). That is, whereas the information 202 displayed in the window 204 is scaled, and thus not full-size, the operation area displayed in the window 302 is not scaled, and thus full-size.

Figure 5:
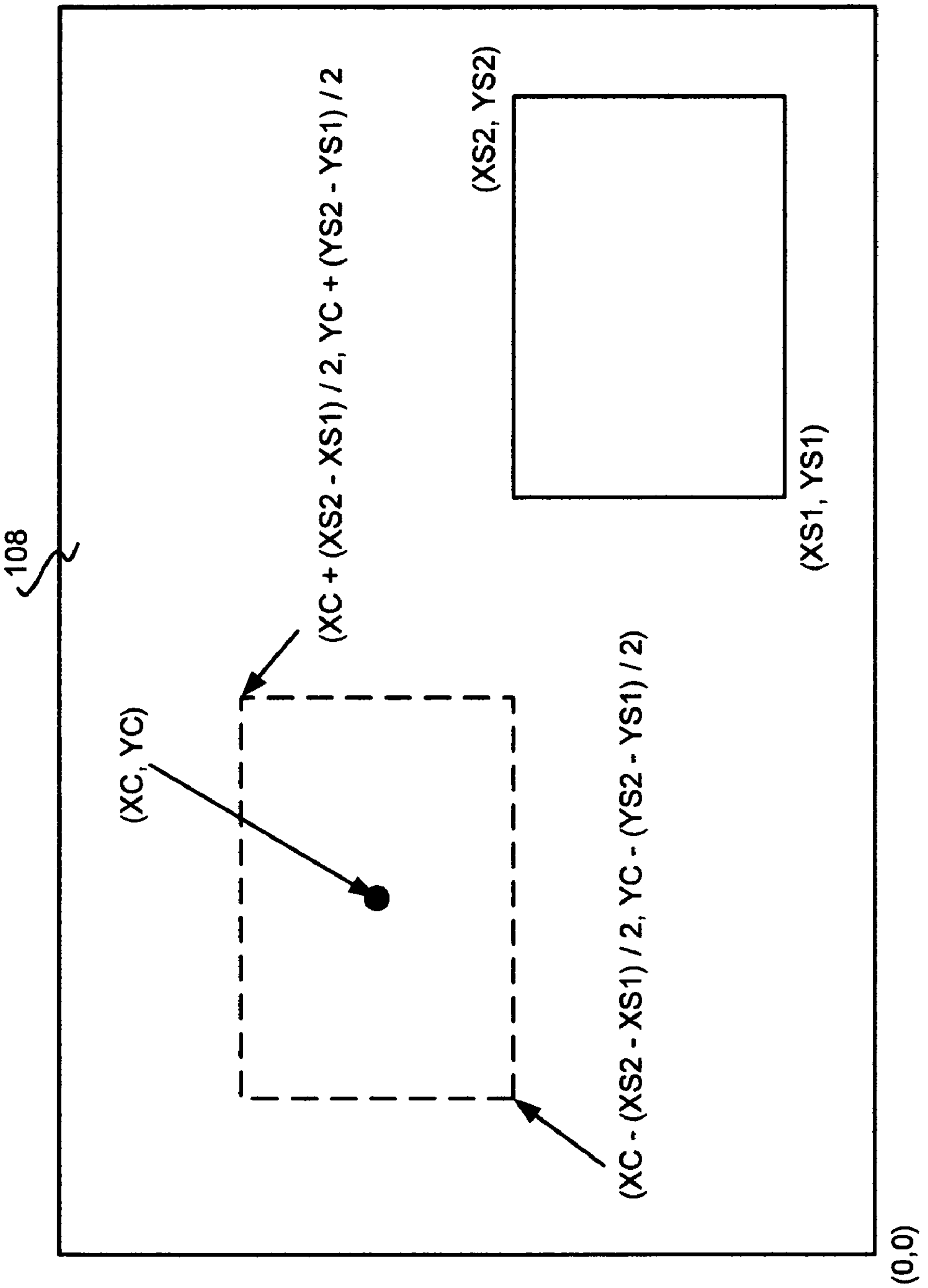
FIG. 5 is a diagram depicting how coordinates of the portion of the operation area of the information to be displayed in the additional window of FIG. 3 can be determined, according to an embodiment of the invention.

In one embodiment, displaying the operation area within the window 302 can include parts 414 and 416. First, coordinates of the portion of the operation area to be displayed within the window 302 are determined (414). For instance, FIG. 5 shows how these coordinates are determined, according to an embodiment of the invention. The window 302 within which an operation area 502 is to be displayed has lower left-hand coordinates (XS1, YS1) and upper right-hand coordinates (XS2, YS2). The operation area 502 is centered at coordinates (XC, YC). Therefore, the lower left-hand coordinates of the portion of the operation area 502 that is to be displayed within the window 302 are $$\left(XC - \frac{XS2 - XS1}{2},\ YC - \frac{YS2 - YS1}{2}\right)$$

and the upper right-hand coordinates of this portion of the operation area 502 are $$\left(XC + \frac{XS2 - XS1}{2},\ YC + \frac{YS2 - YS1}{2}\right).$$

That is, the idea here is that the portion of the operation area 502 that is displayed in the window 302 is the same size as the window 302.

Referring back to the method 400 of FIG. 4, next, the coordinates of the portion of the operation area to be displayed within the window 302 are transformed so that they are mapped to the coordinates of the window 302 (416). For example, for each pair of coordinates (X, Y) of the portion of the operation area to be displayed within the window 302, a corresponding pair of coordinates (XN, YN) is determined to map the coordinates of the portion of the operation area to the window 302. That is, the transformation process maps the portion of the operation area so that it is also displayed within the window 302. In one embodiment, the display 108 has a total width of XD and a total height of YD. In this embodiment, (XN, YN) equals (XD−X, YD−Y) for each pair of coordinates (X, Y).

In another embodiment, coordinate transformation is performed a little differently. In particular, for each pair of coordinates (X, Y) of the operation area to be displayed within the window 302, there is again a corresponding pair of coordinates (XN, YN) that maps the coordinates for display of the operation area within the window 302. In this embodiment, $$XN = XC + \frac{XS2 + XS1}{2} - X,$$

and $$YN = YC + \frac{YS2 + YS1}{2} - Y.$$

Thus, the idea in either such embodiment is that the portion of the operation area that is displayed in the window 302 is mapped such that it is displayed within the window 302 in a full-size, non-scaled manner and is right-side-up to the user 102.

Figure 6:
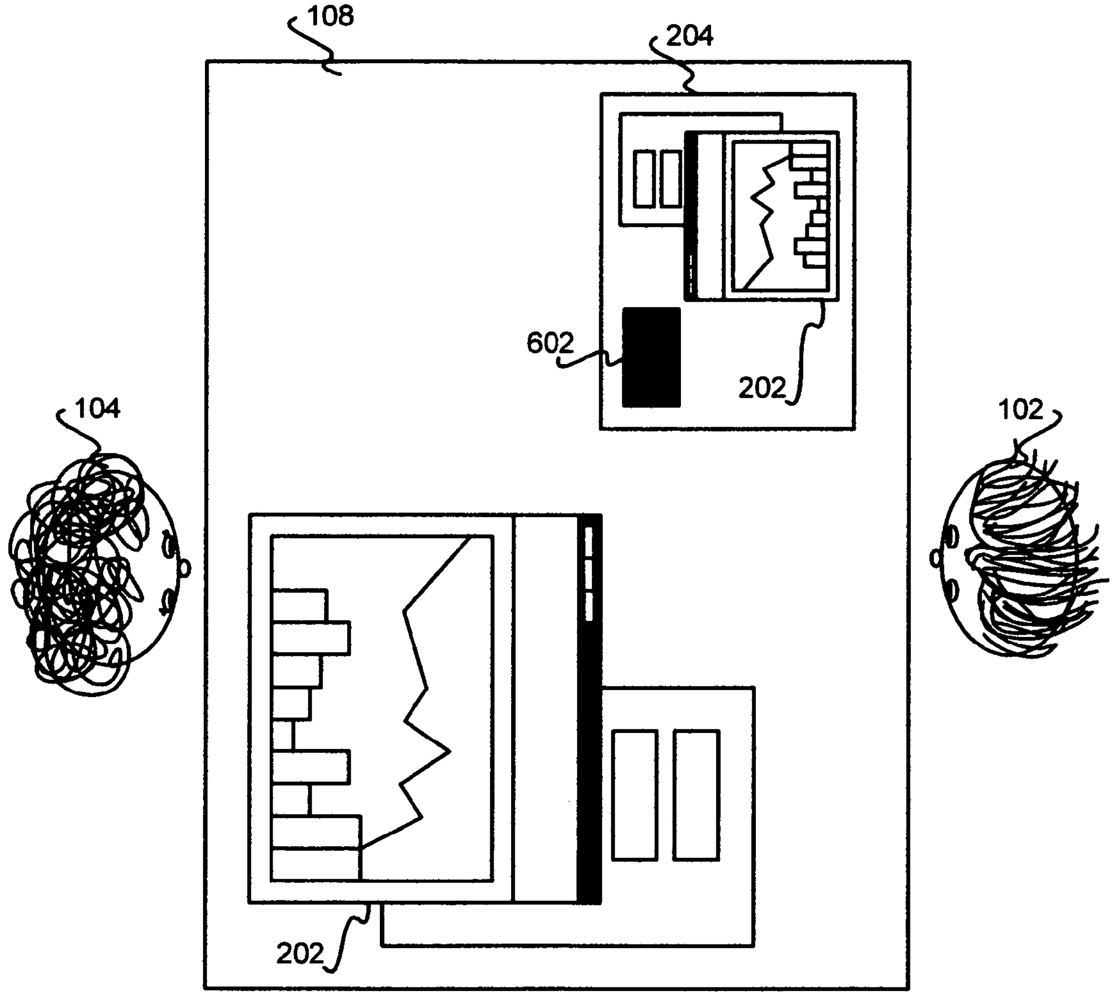
FIG. 6 is a top-view diagram of the display of FIG. 1, in which there is a window having a blacked-out portion, according to an embodiment of the invention.

FIG. 6 shows a top view of the display 108 of the computing device 106, according to another embodiment of the invention. As has been described, the user 102 views the information 202 take accounts for the vast majority of the size of the display 108 upside-down, whereas the user 104 views this information 202 right-side-up. However, there is a window 204 in which the information 202 is displayed in a scaled manner, and that is displayed right-side-up to the user 102.

In the embodiment of FIG. 6, there is a blacked-out portion 602 that corresponds to the placement of the window 204 in relation to the information 202 displayed on the display 108. That is, the blacked-out portion 602 corresponds to the overlap of the window 204 in relation to the information 202. The portion 602 is considered blacked out in the sense that blacked out as used in relation to embodiments of the invention means that the portion 602 is denoted. That is, the portion 602 denotes the position of the window 204 in relation to the information 202 displayed on the display 108. As a result, the user 102 is able to see what part of the information 202 that is viewable by the user 104 that is particularly overlapped by the window 204.

Figure 7:
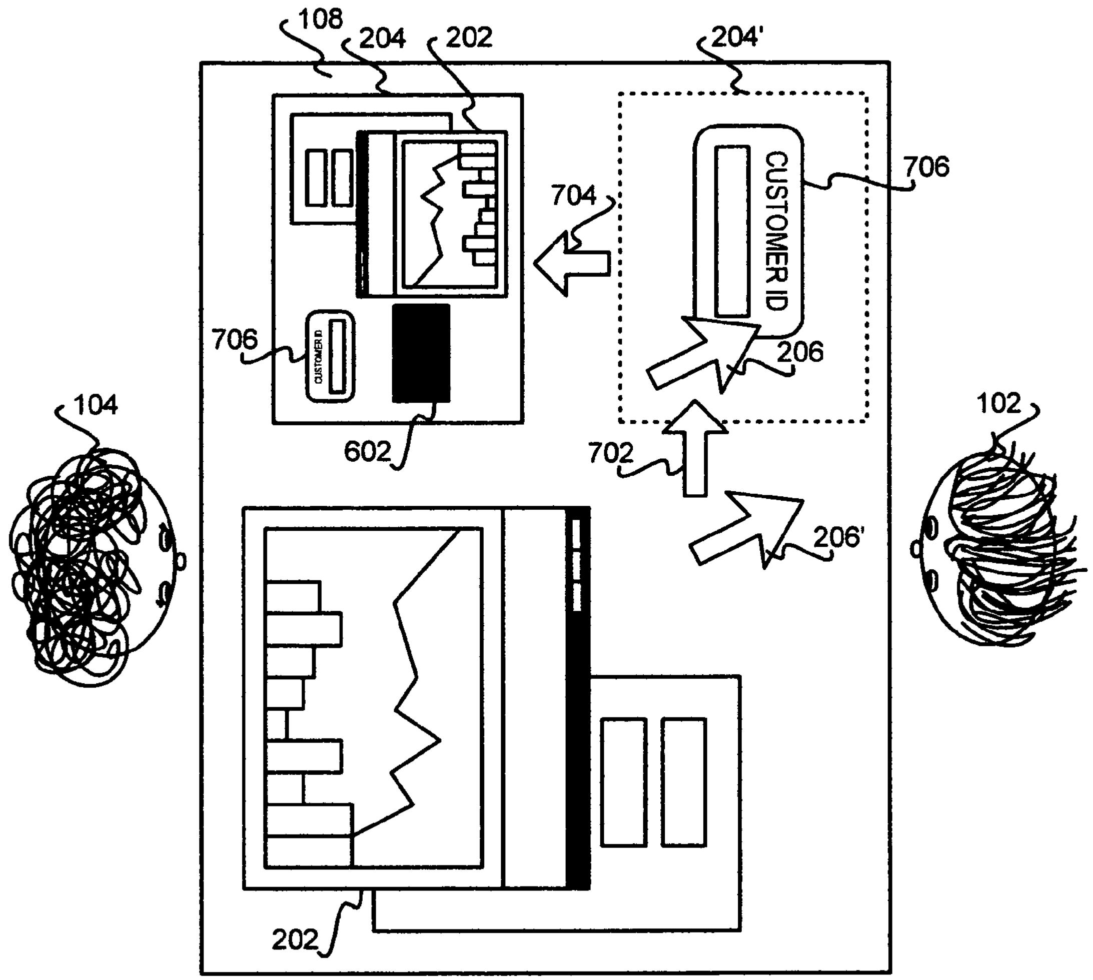
FIG. 7 is a top-view diagram of the display of FIG. 1, showing how a window can be moved to view the information overlapped by the window, according to an embodiment of the invention.

FIG. 7 shows a top view of the display 108 of the computing device 106, according to still another embodiment of the invention. As has been described, the user 102 views the information 202 take accounts for the vast majority of the size of the display 108 upside-down, whereas the user 104 views this information 202 right-side-up. However, there is a window 204 in which the information 202 is displayed in a scaled manner, and that is displayed right-side-up to the user 102.

As has been described in relation to FIG. 6, the window 204 overlaps a portion of the information 202. In the embodiment of FIG. 7, when the user 102 performs input actions in relation to the portion of the information 202 that is overlapped by the window 204, the window 204 is automatically moved. Thus, as depicted in FIG. 7, the user 102 is performing pointing device actions causing the pointer 206 to move from its original position 602' to its current location, as indicated by the arrow 702, related to the portion 706 overlapped by the window 204 in its original position 204'. In response, the window 204 is moved from its original position 204' to its current location, as indicated by the arrow 704. As a result, the window 204 no longer overlaps the portion 706 of the information 202 in relation to which the user is performing input actions.

Therefore, the embodiment of FIG. 7 operates as follows. When the user 102 is performing keyboard input, the portion of the information 202 that receives or otherwise displays this input is denoted as an operation area. If the user is not performing keyboard input, but is moving the pointer via pointing device input, then the portion of the information 202 at which the pointer is currently displayed is the operation area. If the user is not performing keyboard input, and is not performing pointing device input, then the portion of the information 202 that has focus is the operation area. Regardless of how the operation area is determined, if the window 204 overlaps this operation area, then the window 204 is moved so that it no longer overlaps this operation area. It is noted that the embodiments of FIGS. 3, 6, and 7 are not mutually exclusive, and can be used or implemented together.

Figure 8:
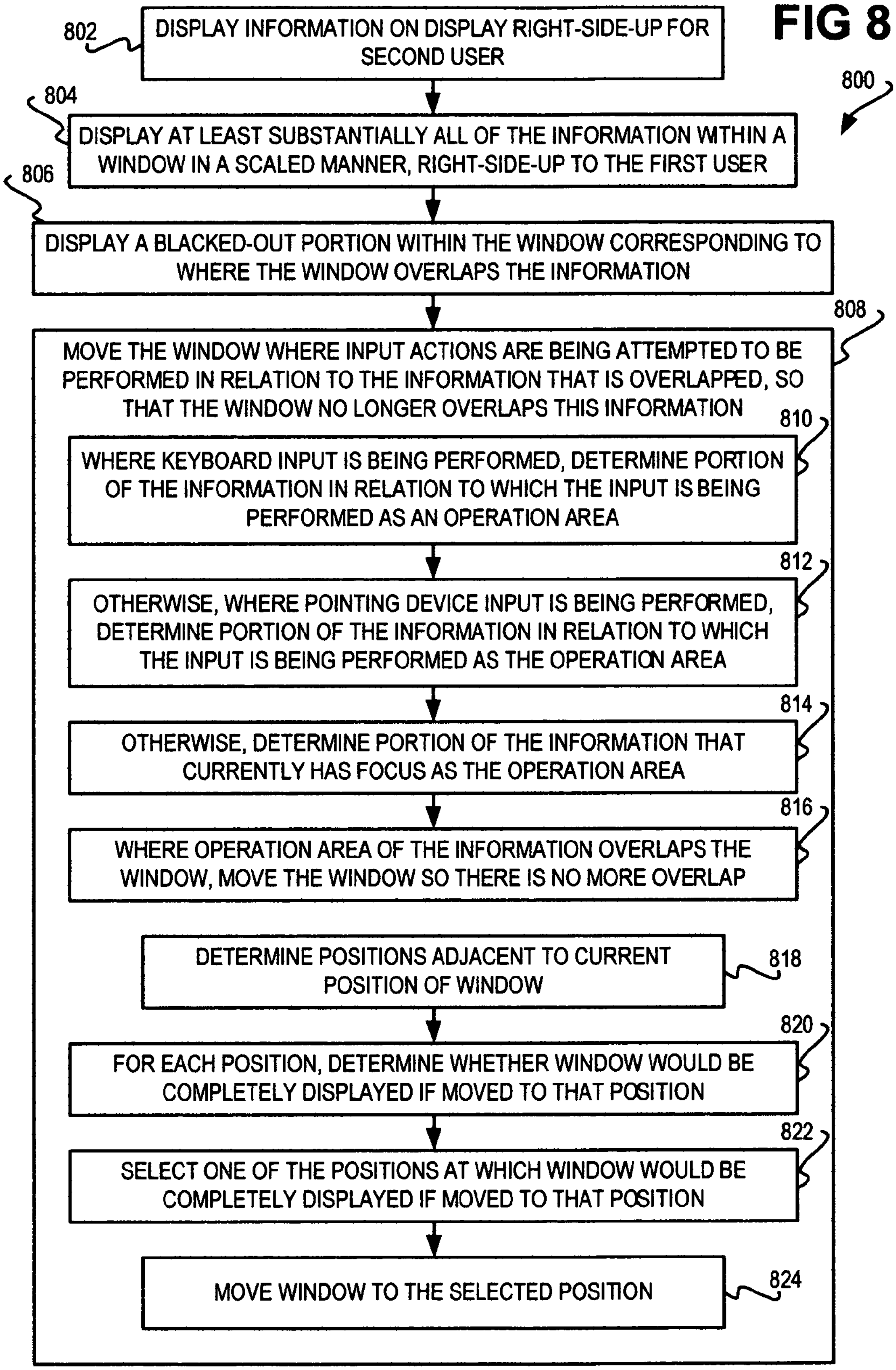
FIG. 8 is a flowchart of a method for achieving the display of information depicted in FIGS. 6 and 7, according to an embodiment of the invention.

FIG. 8 shows a method 800 that achieves the display of information on the display 108 of FIGS. 6 and 7, according to an embodiment of the invention. The method 800 is described in relation to FIGS. 6 and 7 for descriptive clarity. It is noted that the method 800 may be repeated periodically, such as every 100 or 200 milliseconds. First, the information 202 is displayed on the display 108, such that the information 202 is right-side-up to the user 104 (402), and at least substantially all of the information 202 is displayed within the window 204 in a scaled manner, right-side-up to the user 102 (404), as is conventional. It is noted that the information 202 accounts for a majority of the size or space of the viewable area of the display 108. The information 202 itself is inherently considered to be full-sized, and non-scaled. The window 204 overlaps a portion of the information 202, as has been described.

Next, a blacked-out portion 602 is displayed within the window 204 (806). The portion 602 corresponds to where the window 204 overlaps the information 202. The window 204 is further moved where input actions are being attempted to be performed in relation to the information 202 that is overlapped, so that such portions of the information 202 are no longer overlapped by the window 204 (806). In one embodiment, parts 810, 812, 814, and 816, and/or parts 818, 820, 822, and 824 may be performed as part of part 806 of the method 800 of FIG. 8.

Where keyboard input is being performed, such as one or more keys being pressed by the user 102 on the keyboard of the computing device 106 of FIG. 1, the portion of the information 202 in relation to which the input is being performed is considered an operation area (810). By comparison, where keyboard input is not being performed, but where pointing device input is being performed, the portion of the information 202 in relation to which this input is being performed is considered the operation area (812). Where neither keyboard input nor pointing device input is being performed, the portion of the information 202 that currently has focus is considered the operation area (814). Regardless of how the operation area is determined, however, where the operation area overlaps the window 204, the window 204 is moved so that it no longer overlaps the operation area (816).

Next, to determine where to move the window 204, the following can be performed. First, a number of positions adjacent to the current position of the window 204 are determined (818). In one embodiment, four such positions are determined: the position above the current position, the position to the left of the current position, the position to the right of the current position, and the position below the current position. For each such position, it is determined whether the window 204 would be completely displayed on the display 108 if it were moved to that position (820).

For instance, consider the position 204' of the window 204 in FIG. 7. From the perspective of the user 102, the position to the right of the position 204' would not be completely displayed on the display 108, if at all. Similarly, the position below the position 204' would not be completely displayed on the display 108, if at all. The position to the left of the position 204' would be completely displayed on the display 108, however, as would the position above the position 204.

Referring back to FIG. 8, one of the positions at which the window 204 would be completely displayed on the display 108 if the window 204 were moved to that position is selected (822). Furthermore, this selected position is such that the window 204 no longer overlaps the operation area previously determined. For instance, consider the position 204' of the window 204 in FIG. 7 again. Of the two positions to which the window 204 can be moved to from the position 204' such that the window 204 is completely displayed on the display 108, the position to the left of the position 204' is likely to still overlap the operation area to some extent, corresponding to the portion 706 of the information 202.

Therefore, the position selected is the other position to which the window 204 can be moved to from the position 204' such that the window 204 is completely displayed on the display 108, which is the position above the position 204'. This is the position of the window 204 particularly indicated in FIG. 7. Referring back to FIG. 8, then, the window 204 is moved to the selected position (824). It is further noted that the method 800 of FIG. 8 can be performed in conjunction with the method 400 of FIG. 4, and the methods 400 and 800 are not mutually exclusive.

Figure 9:
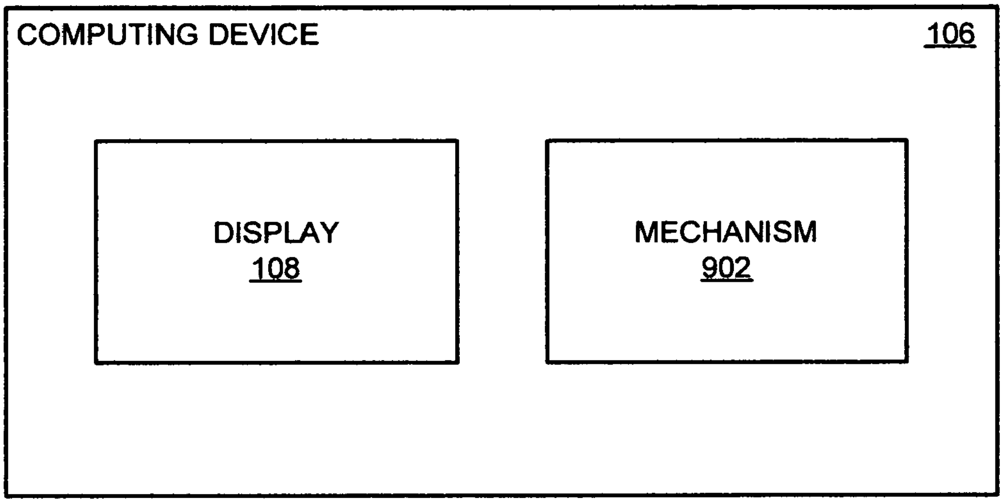
FIG. 9 is a block diagram of a representative computing device, according to an embodiment of the invention.

FIG. 9 shows a rudimentary block diagram of the computing device 106, according to an embodiment of the invention. The computing device 106 is depicted as including the display 108, and a mechanism 902. As can be appreciated by those of ordinary skill within the art, the computing device 106 can and typically does include other components, in addition to those depicted in FIG. 9.

The computing device 106, as has been described, may be a portable computing device, such as a laptop or notebook computer. The display 108 may thus be hinged so that it is adapted to being positioned substantially parallel to the surface on which the computer rests. The computing device 106 may itself be just a display device including the display 108, such as a table-top display device. Other embodiments of the computing device 106 are also possible, as can be appreciated by those of ordinary skill within the art.

The mechanism 902 can be implemented in software, hardware, or a combination of software and hardware. The mechanism 902 is to at least substantially oriented the information so that it is right-side-up for the user 104. The mechanism 902 is further to display the window 204 in which at least substantially all of this information is displayed in a scaled manner, and right-side-up for the user 102. The mechanism 902 also performs the other functionality that has been described herein. That is, the mechanism 902 is that which performs the methods 400 and 800 that have been described in relation to information displayed on the display 108 of the computing device 106.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof

We claim:

1. A computing device comprising:

a display at which a first user is to view the display at a first end of the display and a second user is to view the display at a second end of the display opposite the first end;

a mechanism to at least substantially orient information displayed on the display so that the information is right-side-up for the first user, and to display a first window that is right-side-up for the second user and that displays at least substantially all of the information in a scaled manner, the first window overlapping the information displayed on the display;

wherein the mechanism is further to display a blacked-out portion within the first window corresponding to where the first window overlaps the information displayed on the display.

2. The computing device of claim 1, where the mechanism is further to display a second window on the display that is right-side-up for the first user and that displays a portion of the information in a full-size, non-scaled manner, and wherein the mechanism is further to permit the first user to perform input actions in relation to the portion of the information displayed within the second window.

3. The computing device of claim 2, wherein the mechanism is to display the portion of the information within the second window in relation to which the first user is attempting to perform input actions.

4. The computing device of claim 2, wherein the mechanism is to display the portion of the information within the second window that has focus where the first user is not attempting to perform input actions.

5. The computing device of claim 2, wherein the input actions comprise at least one of: keyboard input, and pointing device input.

6. The computing device of claim 1, wherein the mechanism is further to move the first window where input actions are attempted to be performed in relation to the information where the first window is overlapping the information, so that the first window no longer overlaps the information where the input actions are attempted to be performed.

7. The computing device of claim 6, wherein the mechanism is to detect that the input actions are being attempted to be performed in relation to the information where the first window is overlapping the information.

8. The computing device of claim 1, wherein the computing device is a laptop computer, the display being hinged so that it is adapted to being positioned substantially parallel to a surface on which the laptop computer is situated, so that both the first and the second users are able to view the display.

9. A method performed in relation to a display for a computing device at which a first user is to view the display at a first end thereof and a second user is to view the display at a second end thereof opposite the first end, the method comprising:

displaying information accounting for a majority of a size of the display on the display such that the information is at least substantially oriented to be right-side-up for the second user;

where keyboard input is being performed on the computing device, determining a portion of the information in relation to which the keyboard input is being performed as an operation area of the information;

otherwise, where pointing device input is being performed on the computing device, determining a portion of the information in relation to which the pointing device input is being performed as the operation area of the information;

otherwise, determining a portion of the information that currently has focus as the operation area of the information;

displaying at least a portion of the operation area of the information within a window on the display that is right-side-up for the first user, such that the portion of the operation area is displayed in a full-size, non-scaled manner; and, displaying a blacked-out portion within the window corresponding to where the window overlaps the information.

10. The method of claim 9, further comprising repeating the method periodically.

11. The method of claim 9, further comprising displaying another window on the display that is right-side-up for the first user and in which at least substantially all of the information is displayed in a scaled manner.

12. The method of claim 9, wherein displaying the portion of the operation area of the information within the window on the display that is right-side-up for the first user comprises, for the window having lower left-hand coordinates (XS1, YS1) and upper right-hand coordinates (XS2, YS2), and the operation area centered at coordinates (XC, YC), determining lower left-hand coordinates of the portion of the operation area to be displayed within the window as $$\left(XC - \frac{XS2 - XS1}{2}, YC - \frac{YS2 - YS1}{2}\right)$$

and upper right-hand coordinates of the portion of the operation area displayed within the window as $$\left(XC + \frac{XS2 - XS1}{2}, YC + \frac{YS2 - YS1}{2}\right).$$

13. The method of claim 12, wherein displaying the portion of the operation area of the information within the window on the display that is right-side-up for the first user further comprises performing coordinate transformation on the portion of the operation area to be displayed within the window, where for each coordinate (X, Y) of the portion of the operation area, a corresponding coordinate (XN, YN) is determined for displaying the portion of the operation area within the window, where XN equals XD−X and YN equals YD−Y, XD being a width of the display and YD being a height of the display.

14. The method of claim 12, wherein displaying the portion of the operation area of the information within the window on the display that is right-side-up for the first user further comprises performing coordinate transformation on the portion of the operation area to be displayed within the window, where for each coordinate (X, Y) of the portion of the operation area, a corresponding coordinate (XN, YN) is determined for displaying the portion of the operation area within the window, where $$XN = XC + \frac{XS2 + XS1}{2} - X$$

and $$YN = YC + \frac{YS2 + YS1}{2} - Y.$$

15. A method performed in relation to a display for a computing device at which a first user is to view the display at a first end thereof and a second user is to view the display at a second end thereof opposite the first end, the method comprising:

displaying information accounting for a majority of a size of the display on the display such that the information is at least substantially oriented to be right-side-up for the second user;

displaying a window on the display that is right-side-up for the first user and in which at least substantially all of the information is displayed in a scaled manner and that overlaps the information:

displaying a blacked-out portion within the window corresponding to where the window overlaps the information; and, moving the window where input actions are being attempted to be performed in relation to the information where the first window overlaps the information, so that the window no longer overlaps the information where the input actions are being attempted to be performed.

16. The method of claim 15, further comprising repeating the method periodically.

17. The method of claim 15, further comprising determining a size and a location of the window in relation to the information.

18. The method of claim 15, wherein moving the window where input actions are being attempted to be performed in relation to the information where the first window overlaps the information comprises:

where keyboard input is being performed on the computing device, determining a portion of the information in relation to which the keyboard input is being performed as an operation area of the information;

otherwise, where pointing device input is being performed on the computing device, determining a portion of the information in relation to which the pointing device input is being performed as the operation area of the information;

otherwise, determining a portion of the information that currently has focus as the operation area of the information;

where the operation area of the information overlaps the window, moving the window so that the window no longer overlaps the operation area of the information.

19. The method of claim 15, wherein moving the window where input actions are being attempted to be performed in relation to the information where the first window overlaps the information comprises:

determining a plurality of positions adjacent to a current position of the window;

for each position, determining whether the window would be completely displayed if moved to the position;

selecting one of the positions at which the window would be completely displayed to which to move the window; and, moving the window from the current position to the one of the positions selected.

* * * * *